UNITED STATES PATENT OFFICE.

GEORGE T. JOHNSON, OF PITTSYLVANIA C. H., VIRGINIA.

IMPROVEMENT IN INSECT-DESTROYING COMPOUNDS.

Specification forming part of Letters Patent No. 176,002, dated April 11, 1876; application filed May 24, 1875.

*To all whom it may concern:*

Be it known that I, GEORGE THOMAS JOHNSON, of Pittsylvania Court-House, in the county of Pittsylvania and State of Virginia, have invented a new and Improved Compound for Destroying the Tobacco-Fly; and I do hereby declare that the following is a full, clear, and exact description of the same:

The invention contemplates the application of a comminuted poison to the leaves of young tobacco, so as to destroy the life of a destructive insect known as the "tobacco-fly."

The invention will first be fully described, in connection with all that is necessary to a full understanding thereof, and then pointed out in the claim.

The compound consists of the following ingredients, which may be mixed in the quantities named, or in corresponding proportions:

I take a pint of kerosene-oil, a pint of turpentine, and a table-spoonful of sulphur, diluting these in a quart of water. The whole is thoroughly intermixed, and applied to the growing plants with a brush or sprinkled thereon in any suitable manner. The compound is found, in practice, to destroy the life of the insect and relieve the plant from further attacks at this season of the year.

Having thus described my invention, what I claim as new is—

A compound of kerosene-oil, turpentine, and sulphur, in the proportions and for the purpose specified.

GEORGE THOMAS JOHNSON.

Witnesses:
STEPHEN YEATTS,
J. D. HUNT.